No. 758,181. PATENTED APR. 26, 1904.
C. G. HUNTER.
KNOCKDOWN GATE.
APPLICATION FILED JULY 15, 1903.
NO MODEL.
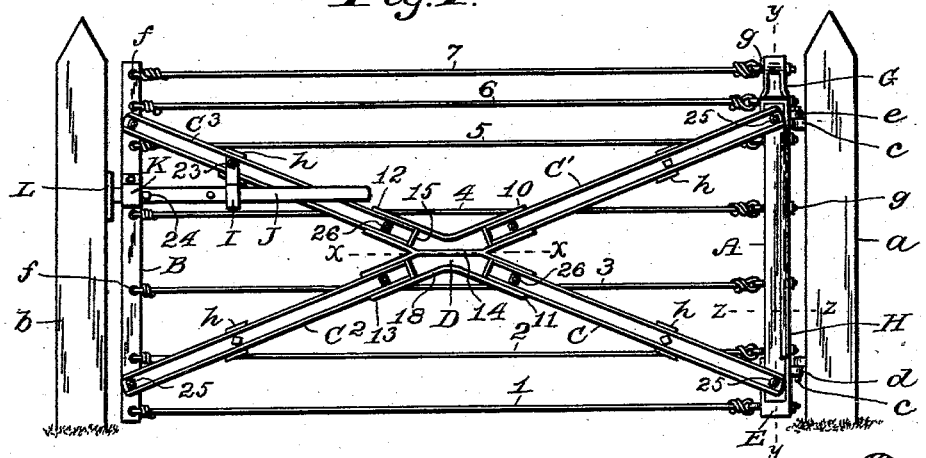
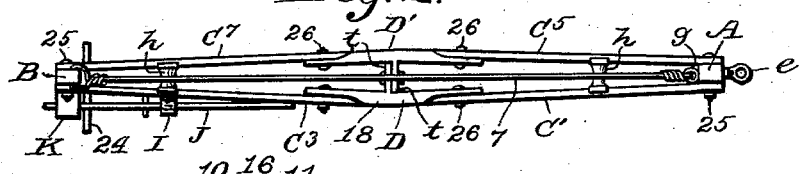
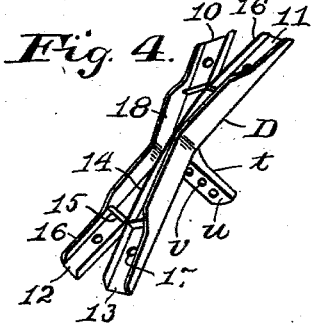
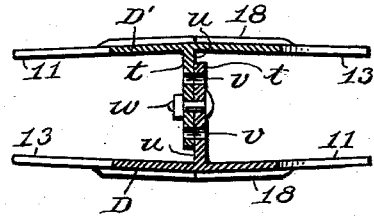
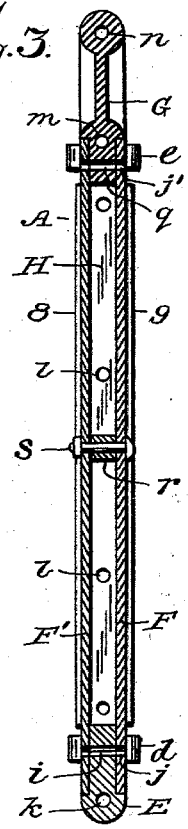
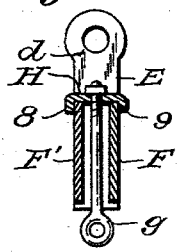
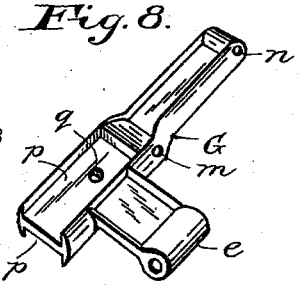
Witnesses:
Don W. Vorhies.
Stella Snider.
Inventor:
Charles G. Hunter,
By E. T. Silvius,
Attorney.

No. 758,181. Patented April 26, 1904.

UNITED STATES PATENT OFFICE.

CHARLES G. HUNTER, OF LAWRENCE, INDIANA.

KNOCKDOWN GATE.

SPECIFICATION forming part of Letters Patent No. 758,181, dated April 26, 1904.

Application filed July 15, 1903. Serial No. 165,542. (No model.)

*To all whom it may concern:*

Be it known that I, CHARLES G. HUNTER, a citizen of the United States, residing at Lawrence, in the county of Marion and State of Indiana, have invented new and useful Improvements in Knockdown Gates; and I do declare the following to be a full, clear, and exact description of the invention, reference being had to the accompanying drawings, and to the letters and figures of reference marked thereon, which form a part of this specification.

My invention relates to gates of the large class, such as farm-gates, and it has reference more particularly to gates that are designed to be knocked down for shipment, the objects of the invention being to provide, first, substantial metallic gates adapted to be cheaply constructed in parts and packed or crated conveniently for shipment, to be put together and hung at the places where they are to be used; second, to improve the construction of trussed gates in order that they may be made symmetrically of bar-iron having flanges, such as channel-iron; third, to provide a construction that will admit of ready repair when accidentally broken, and, fourth, to provide for readjustments of the frames and the line wires or bars of the gates. I attain these objects by the construction illustrated in the accompanying drawings, in which—

Figure 1 is a side elevation of the whole gate hung and latched; Fig. 2, a top plan of the gate dismounted; Fig. 3, a vertical transverse section of the main bar or stile, taken on the line $y\,y$ in Fig. 1, minor parts being omitted; Fig. 4, a perspective view of one of the centerpieces of the double trusses forming parts of the gate-frame; Fig. 5, a horizontal sectional view of a pair of the centerpieces, taken on the line $x\,x$ in Fig. 1; Fig. 6, a horizontal sectional view of the main bar or stile of the gate, taken on the line $z\,z$ in Fig. 1; Fig. 7, a transverse vertical sectional view taken centrally of the latch-hanger connected to a truss-bar, the latter being in transverse section; and Fig. 8, a perspective view of the top piece of the main bar.

Similar reference characters refer to similar parts throughout the several views.

The gate is designed to be hung to an upright post $a$ and to be latched to a similar post $b$ and to swing in both directions from the latch-post, although, of course, the post $b$ may be set so as to permit the gate to swing in only one direction to open it. The hinge parts $c$ for the post and the parts $d$ and $e$ for the gate may be variously designed and are furnished with the gate.

In construction the gate comprises a composite main bar A, having the hinge parts $d$ and $e$, and end bar B, having apertures $f$, trussed composite diagonal braces secured to the main bar and the end bar at both sides thereof, a suitable number of horizontal wires or bars, as 1, 2, 3, 4, 5, 6, and 7, having adjusting-screws $g$, secured to the main bar and also to the end bar, and a suitable latch. The trussed braces comprise four bars $C\ C'\ C^2\ C^3$ and a centerpiece D at one side of the gate, and similar bars, as $C^5\ C^7$, and a like centerpiece D' at the opposite side of the gate, the centerpieces being connected together, the diagonal braces being both alike at opposite sides of the gate. Suitable hollow brace-posts $h$ are secured between the bars forming the trussed braces by means of bolts or rivets.

The composite main bar A comprises, essentially, a foot-piece E, composed, preferably, of malleable iron, to which the hinge part $d$ is directly attached, preferably as an integral part, a pair of trunk-plates F F', composed of rolled bar-iron and secured to opposite sides of the foot-piece, a head-piece G, composed, preferably, of malleable iron, to which the hinge part $e$ is directly attached, preferably as an integral part thereof and secured to the trunk-plates, and a spacing-plate H, extending against the trunk-plates between the foot and head pieces. The foot-piece E has a transverse bolt-hole $i$, and the lower ends of the plates F F' have like holes $j$ for use in bolting the foot-piece between the plates. The upper ends of the plates have holes $j''$ and the head-piece has a like hole $q$, the head-piece having recesses $p$ at opposite sides to receive the ends of the plates and the foot-piece being similarly provided with recesses. The foot-piece E has a hole $k$ at the lower end thereof to receive an adjusting-screw $g$, formed as an eye-bolt with a nut thereon. The plate H has a suitable number of similar holes $l$ to receive adjusting-screws, and some plates may have more or less than others, as may be desired. The head-piece G has a similar bolt-hole $m$ near the middle portion thereof and a like hole $n$ at the upper end thereof to receive the upper adjusting-screws. A thimble $r$ is secured between the plates F and F' by means of a bolt $s$ to stiffen the trunk and to hold the two plates together while assembling the parts of the gate. The plate H has flanges 8 and 9, engaging the plates F F'.

The centerpieces D and D' are alike, preferably composed of malleable iron, and when connected together one piece is reversed with respect to the other. Each piece has a tie-bar $t$ attached to its inner side, the tie-bar having a joint face $u$ in a plane at the center of the length of the whole centerpiece, and also having a suitable number of bolt-holes $v$ to receive a binding-bolt $w$. Four arms 10, 11, 12, and 13 radiate from the body portion of each piece D or D', and the outer face of each piece has a longitudinal center rib 14, at the ends of which are transverse ribs 15, which serve as gages for the bars that are attached to the arms, the arms having side flanges 16 on their outer faces. Said arms also have each a bolt-hole 17. The body portion of each centerpiece D or D' has side flanges 18 at the outer face thereof.

While various types of latches may be employed, I provide a strong form by securing a hanger I, having an opening 19, to the diagonal brace-bar $C^3$, the hanger having a suitable head 20, adapted to fit the form of the bar, which in the present case has flanges 21 and 22, a bolt 23 completing the connection and extending through a brace $h$. A sliding latch-bar J is mounted in the opening 19 and also in a hanger K, attached to the end bar B, a suitable latch-plate L being provided to be attached to the post $b$. The bar J is provided with an operating-finger 24.

Suitable bolts 25 are employed whereby the trussed braces are secured to the end bar B, and similar bolts secure the braces to the main bar A, and also secure the head-piece G and the foot-piece E to the plates F F'. Other bolts 26 of suitable lengths secure the bars of the trussed braces to their centerpieces. The plate H is held in place by means of the horizontal wires and their adjusting screws, as will be seen.

The various parts may be cheaply made in quantities at factories and shipped knocked down in convenient compass for handling, while any one may set up the gate and hang it without requiring expert assistance. It is desirable that the bars, as C, be composed of channel or angle iron, and the bolt-holes may be punched by gage, so that each bar will be like all the others, and all being equal in length will be interchangeable with the others. Suitable stays may be attached to the horizontal wires of the gate, as will be obvious, and the top wire 7 and others may be barbed, if desired. When assembling the parts of the gate, the frame parts are to be connected together first, and then the horizontal wires are to be stretched by means of their adjusting-screws $g$, extending through the holes $k$, $l$, $m$, and $n$. In the larger gates the centerpieces D and D' are spread apart more than in smaller gates, as will be understood.

In practical use the gate will be found to be light and yet strong in the desired directions. Should any part be accidentally damaged, it may be easily and cheaply repaired or a new one obtained from the factory and placed in position without serious loss. All of the bars being comparatively short when separate, they are not liable to be bent in shipment.

Having thus described my invention, what I claim as new is—

1. A gate including a main bar, an end bar, trussed composite braces attached to the main and end bars and comprising a pair of opposing centerpieces having coöperating tie-bars detachably secured together, and diagonal bars attached to the centerpieces, and wires attached to the main bar and to the end bar.

2. A gate including a composite main bar comprising trunk-plates and foot and head pieces secured thereto and having hinge parts attached thereto, and a flanged plate engaging the trunk-plates; an end bar, trussed diagonal bars secured to the main bar adjacently to the foot and head pieces thereof and also secured to the end bar, and horizontal wires secured to the end bar and having adjusting-screws secured to the flanged plate.

3. A gate including a main bar, an end bar, trussed composite braces attached to the main and end bars and comprising a pair of opposing centerpieces having each a tie-bar attached to the inner side thereof, said tie-bars being in engagement, a bolt securing said tie-bars together, and diagonal bars attached to the centerpieces, and wires attached to the main bar and to the end bar.

4. In a gate, the combination of a composite main bar comprising a pair of opposing trunk-plates, a foot-piece secured between the lower ends of the trunk-plates and having a hinge part attached thereto and also having a bolt-hole in the lower end thereof, a head-piece secured between the upper ends of the trunk-plates and having a hinge part attached thereto and having also a hole therein to receive an adjusting-screw of a horizontal wire, and a spacing-plate having flanges engaging the trunk-plates and extending from the foot-piece to the head-piece and having bolt-holes therein, an end bar, trussed diagonal braces, a horizontal wire connected to the end bar and also to the foot-piece, horizontal wires connected to the end bar and also to the spacing-plate, and a horizontal wire connected to the end bar and also to the head-piece.

5. In a gate, the combination of a main bar having a pair of trunk-plates, a foot-piece and a head-piece secured to the trunk-plates, a spacing-plate engaging the trunk-plates and having bolt-holes therein, frame members attached to the main bar and also to the end bar, adjusting-screws extending between the trunk-plates and through the holes in the spacing-plate, and horizontal wires connected to the adjusting-screws and also to the end bar.

6. In a gate, the combination of a main bar, an end bar, trussed composite braces attached to the main and end bars and comprising a pair of centerpieces having arms provided with flanges and also having tie-bars attached thereto, a bolt securing the tie-bars together, and diagonal bars secured to the arms, horizontal wires connected to the main and end bars, a latch-hanger attached to the end bar, a latch-hanger secured to one of the diagonal bars, and a latch-bar mounted in the hangers.

7. In a gate, the combination of a main bar having a pair of trunk-plates and a perforate spacing-plate engaging the trunk-plates, adjusting-screws extending between the trunk-plates and coöperating with the perforate spacing-plate, a pair of trussed composite braces attached to the main and end bars, and horizontal wires connected to the end bar and also to the adjusting-screws.

8. In a gate, the combination of a main bar, an end bar, trussed composite braces attached to the main and end bars and comprising a pair of centerpieces having arms provided with flanges and also having coöperating tie-bars, and diagonal bars secured to the centerpieces, and horizontal wires connected to the end bar and provided with adjusting-screws coöperating with the main bar.

In testimony whereof I affix my signature in presence of two witnesses.

CHARLES G. HUNTER.

Witnesses:
WM. H. PAYNE,
E. T. SILVIUS.